UNITED STATES PATENT OFFICE.

ALPHONSE GUILLOCHIN, OF FLEURIEU-SUR-SAÖNE, FRANCE, ASSIGNOR OF ONE-HALF TO JEAN GUIMET, OF FLEURIEU-SUR-SAÖNE, FRANCE.

PROCESS FOR THE MANUFACTURE OF ULTRAMARINE.

1,400,431.  Specification of Letters Patent.  Patented Dec. 13, 1921.

No Drawing.  Application filed May 7, 1920.  Serial No. 379,571.

*To all whom it may concern:*

Be it known that I, ALPHONSE GUILLOCHIN, a citizen of the Republic of France, and a resident of Fleurieu-sur-Saöne, Department of Rhône, France, have invented a new and useful Process for the Manufacture of Ultramarine, of which the following is a specification.

This invention relates to the manufacture of ultramarine. Usually there is employed for the manufacture of ultramarine, sodium carbonate or sodium sulfate. In the composition of the materials which serve for the manufacture of the blue, there is generally utilized sodium carbonate to which may be added sulfate of soda. These two bodies during recent years have greatly increased in price and have even become scarce by reason of the lack of coal. It has thus become necessary to search if other and less expensive salts of soda cannot replace them.

It has been ascertained and this is the subject of the present invention, that sodium carbonate and sodium sulfate could be advantageously replaced by alkaline metal sulfites and bisulfites in the manufacture of ultramarine. Now, sodium sulfite in particular is a residue from the manufacture of phenols, a residue of which the uses are limited, but which exists abundantly, by reason of the large quantities of phenols produced in the manufacture of explosives. The utilization of sodium sulfite in the manufacture of ultramarine thus enables a residue to be employed which hitherto was almost without industrial value.

As with known processes, it enables ultramarine blues, rich or poor in silica, to be obtained as also ultramarine greens; my sulfite process has nothing in common with the old sulfate process affording in two stages an inferior ultramarine; it is on the contrary, comparable with the carbonate process giving in one step either blue or green ultramarines of high quality according to the manner in which I operate.

Example: A mixture by weight of—

| | |
|---|---|
| Kaolin | 150 parts |
| Sodium sulfite | 115 parts |
| Reducing agent (*e. g.* resin) | 21 parts |
| Sulfur | 200 parts | is heated in crucibles or in muffles; the temperature of the furnaces is slowly raised to 850° C. at which it is maintained from 6 to 12 hours, and oxidization consequent upon slow cooling of the furnaces (which cooling may take 5 to 20 days) completes the operation.

Obviously the proportions of the constituents can be varied according to their nature, the sulfite can be replaced by bisulfite or by a mixture of sulfite and bisulfite, and the substitution of the sulfites and bisulfites for the carbonate and the sulfate may be partial or total.

Having now particularly described and ascertained the nature of my said invention and in what manner the same is to be performed, I declare that what I claim is:—

1. In the manufacture of ultramarine blue or green, the step of heating a mixture of clay, sulfur, and alkaline metal sulfite.

2. In the manufacture of ultramarine blue or green, the step of heating a mixture of clay, sulfur, and sodium sulfite.

3. In the manufacture of ultramarine blue or green, the step of heating a mixture of clay, sulfur and sodium sulfite, together with a reducing agent.

4. In the manufacture of ultramarine blue or green, the step of heating a mixture of clay, sulfur, sodium sulfate and sodium sulfite, together with a reducing agent.

5. In the manufacture of ultramarine blue or green, the step of heating a mixture of clay, sulfur, sodium sulfate, sodium carbonate and sodium sulfite, together with a reducing agent.

In testimony whereof I have signed my name to this specification.

ALPHONSE GUILLOCHIN.

Witnesses:
 LOUIS ERCHER,
 JULIAN KEMBLE FUEDREY.